(12) United States Patent
Oono et al.

(10) Patent No.: US 11,534,908 B2
(45) Date of Patent: Dec. 27, 2022

(54) OPERATION ADJUSTMENT APPARATUS FOR ADJUSTING OPERATION OF ROBOT APPARATUS AND OPERATION ADJUSTMENT METHOD FOR ADJUSTING OPERATION OF ROBOT APPARATUS

(71) Applicant: FANUC CORPORATION, Yamanashi (JP)

(72) Inventors: Kenshirou Oono, Yamanashi (JP); Makoto Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 197 days.

(21) Appl. No.: 16/823,335

(22) Filed: Mar. 19, 2020

(65) Prior Publication Data

US 2020/0306957 A1 Oct. 1, 2020

(30) Foreign Application Priority Data

Mar. 25, 2019 (JP) .............................. JP2019-057062

(51) Int. Cl.
| | |
|---|---|
| *G05B 19/04* | (2006.01) |
| *G05B 19/18* | (2006.01) |
| *B25J 9/16* | (2006.01) |
| *B25J 15/00* | (2006.01) |
| *B25J 19/02* | (2006.01) |

(52) U.S. Cl.
CPC .......... *B25J 9/1602* (2013.01); *B25J 9/1697* (2013.01); *B25J 15/0019* (2013.01); *B25J 19/023* (2013.01)

(58) Field of Classification Search
CPC .... B25J 9/1602; B25J 9/1697; B25J 15/0019; B25J 19/023; B25J 9/1612; B25J 13/08; B25J 9/161; B25J 9/1664; B25J 13/00; B25J 19/04
See application file for complete search history.

(56) References Cited

U.S. PATENT DOCUMENTS

| | | | | |
|---|---|---|---|---|
| 5,319,443 A | * | 6/1994 | Watanabe | ................. G01S 5/16 356/614 |
| 9,205,564 B2 | * | 12/2015 | Popovic | ................. A61B 34/30 |
| 2004/0138783 A1 | | 7/2004 | Watanabe et al. | |

(Continued)

FOREIGN PATENT DOCUMENTS

| | | |
|---|---|---|
| DE | 112011104865 T5 | 11/2013 |
| DE | 102015015638 A1 | 10/2016 |

(Continued)

*Primary Examiner* — Harry Y Oh
(74) *Attorney, Agent, or Firm* — Hauptman Ham, LLP

(57) ABSTRACT

An operation adjustment apparatus includes a camera arranged so as to capture images of a robot and a hand. The robot controller includes an operation control unit that sends an operation command to the robot at a predetermined control cycle. The camera captures images at a time interval that coincides with the control cycle. A determination unit of the robot controller determines whether an operation of the hand is appropriate based on a result of image processing performed by an image processing unit. If the determination unit determines that the operation of the hand is not appropriate, a correction unit of the robot controller corrects a command statement included in an operation program so that the operation of the hand is an appropriate operation.

5 Claims, 9 Drawing Sheets

(56) References Cited

U.S. PATENT DOCUMENTS

| | | | | |
|---|---|---|---|---|
| 2004/0266276 | A1* | 12/2004 | Hariki | H01R 43/26 439/894 |
| 2005/0096792 | A1* | 5/2005 | Watanabe | B25J 19/023 700/245 |
| 2005/0096892 | A1* | 5/2005 | Watanabe | B25J 9/1671 703/7 |
| 2006/0063599 | A1* | 3/2006 | Greenspan | B25J 9/1697 473/1 |
| 2007/0075048 | A1* | 4/2007 | Kunisaki | G05B 19/4083 219/91.1 |
| 2007/0216332 | A1 | 9/2007 | Lambert et al. | |
| 2008/0252248 | A1* | 10/2008 | Lundberg | B25J 9/1697 318/572 |
| 2014/0309762 | A1* | 10/2014 | Hayata | B25J 9/1682 901/42 |
| 2018/0333859 | A1* | 11/2018 | Ban | B25J 9/1697 |
| 2018/0368656 | A1* | 12/2018 | Austin | A61B 1/24 |
| 2020/0021780 | A1* | 1/2020 | Jeong | H04N 5/2253 |

FOREIGN PATENT DOCUMENTS

| | | |
|---|---|---|
| DE | 102016226017 A1 | 6/2018 |
| DE | 112017005867 T5 | 8/2019 |
| EP | 1424173 A2 | 6/2004 |
| EP | 2653414 B1 | 2/2019 |
| JP | S60-16386 A | 1/1985 |
| JP | S61-118810 A | 6/1986 |
| JP | 2000299820 A | 10/2000 |
| JP | 2004174662 A | 6/2004 |
| JP | 2007136975 A | 6/2007 |
| JP | 2008183690 A | 8/2008 |
| JP | 2011-19058 A | 1/2011 |
| JP | 2011-154656 A | 8/2011 |
| JP | 2012159911 A | 8/2012 |
| JP | 2014180707 A | 9/2014 |
| JP | 2015168016 A | 9/2015 |
| JP | 2016203304 A | 12/2016 |

* cited by examiner

FIG. 7

```
1:L P[1] 4000mm/sec CNT100 ;
2:L P[2:Drop_Pos] 4000mm/sec CNT3 TB   .01sec,RO[1]=OFF ACC100 ;
3:L P[1] 4000mm/sec CNT100 ;
```
41

OPERATION ADJUSTMENT APPARATUS FOR ADJUSTING OPERATION OF ROBOT APPARATUS AND OPERATION ADJUSTMENT METHOD FOR ADJUSTING OPERATION OF ROBOT APPARATUS

RELATED APPLICATIONS

The present application claims priority to Japanese Application Number 2019-057062, filed Mar. 25, 2019, the disclosure of which is hereby incorporated by reference herein in its entirety.

BACKGROUND OF THE INVENTION

1. Field of the Invention

The present invention relates to an operation adjustment apparatus that adjusts an operation of a robot apparatus and an operation adjustment method that adjusts the operation of a robot apparatus.

2. Description of the Related Art

In a robot apparatus including a robot, an operation tool corresponding to the type of operation is attached to the robot, and thus various types of operation can be performed. The operation can be performed by cooperation between the operation of the robot and the operation of the operation tool. For example, after the robot reaches a predetermined position, a workpiece can be grasped or released by a hand.

The robot and the operation tool are driven based on an operation program that has been previously created. When the robot apparatus is driven based on the operation program, the robot apparatus may perform an operation slightly different from a desired operation. For example, the position and orientation of the robot at a predetermined time may slightly deviate from the desired position and orientation. An operator can correct the operation of the robot apparatus by observing the state of the robot that is actually driven.

In the prior arts, a camera for monitoring the operation of a robot, which is disposed in a robot apparatus, is known (for example, Japanese Unexamined Patent Publication No. 2011-19058A). Images captured by the camera are processed, and thus the position and orientation of the robot can be detected. For example, a control operation for capturing images of an actually driven robot so as to detect the actual position and orientation of a robot, detecting an abnormal operation of the robot, and correcting the position and orientation of the robot is known (for example, Japanese Unexamined Patent Publication No. 60-16386A and Japanese Unexamined Patent Publication No. 61-118810A).

Alternatively, a peripheral device arranged around a robot may operate according to the operation of the robot. In this respect, it is known that the operation of the peripheral devices is controlled based on images captured by a camera so that the operation of the robot and the operation of the peripheral device are appropriately performed (for example, Japanese Unexamined Patent Publication No. 2011-154656A).

SUMMARY OF THE INVENTION

In recent years, in order to improve the efficiency of producing products, the speed of the operation of a robot has been increased. When the operation speed of the robot is low, the operator can visually observe the operation of the robot. However, it is difficult to visually confirm the operation of the robot driven at high speed. For this reason, when a robot apparatus is driven, it is difficult for the operator to determine whether the operation of the robot apparatus is appropriate. Further, when an operation is not performed as desired by the robot apparatus, it is difficult to adjust the operation of devices such as the robot and the operation tool.

For example, the robot apparatus may perform an operation for conveying a workpiece from one position to another position. The robot apparatus can convey a workpiece by grasping the workpiece with a hand and driving the robot. When the workpiece is grasped with the hand, if the time for starting to drive the hand is early, the workpiece may not be grasped in a desired state. Alternatively, the hand may throw the workpiece up in the air when releasing the workpiece, if the hand starts being driven before the robot reaches a target position.

For this reason, it is necessary to adjust the time for starting to drive the hand in accordance with the state of the robot being driven. However, it is difficult to confirm the state of the robot operating at high speed. In this way, it may be difficult to adjust the operation of the robot apparatus including the robot.

An operation adjustment apparatus according to a first aspect of the present disclosure adjusts an operation of a robot apparatus including a robot. The operation adjustment apparatus includes a high-speed camera arranged so as to capture an image of at least one of the robot and a device that operates in response to an operation of the robot. The operation adjustment apparatus includes a controller for controlling the operation of the robot and the device and receiving images captured by the high-speed camera. The controller includes an operation control unit for sending an operation command to the robot at a predetermined control cycle, and a storage unit for storing an operation program for the robot and the device. The high-speed camera is formed so as to capture images at a time interval that coincides with the control cycle. The controller includes an image processing unit for processing the images captured at the time interval that coincides with the control cycle. The controller includes a determination unit for determining whether at least one of the operation of the robot and an operation of the device is a predetermined operation based on a result of processing performed by the image processing unit. The controller includes a correction unit for correcting a command statement included in the operation program. When the determination unit determines that at least one of the operation of the robot and the operation of the device is not the predetermined operation, the correction unit corrects the command statement included in the operation program so that the operation of the robot and the operation of the device correspond to the predetermined operation.

An operation adjustment apparatus according to a second aspect of the present disclosure adjusts an operation of a robot apparatus including a robot. The operation adjustment apparatus includes a high-speed camera arranged so as to capture an image of at least one of the robot and a device that operates in response to an operation of the robot. The operation adjustment apparatus includes a controller for controlling the operation of the robot and the device and receiving images captured by the high-speed camera. The controller includes an operation control unit for sending an operation command to the robot at a predetermined control cycle, and a storage unit for storing an operation program for the robot and the device. The high-speed camera is formed so as to capture images at a time interval that coincides with the control cycle. The controller includes an image processing unit for processing the images captured at the time interval that coincides with the control cycle. The controller includes a determination unit for determining whether the robot reaches a target position for starting an operation of the device based on a result of processing performed by the image processing unit. The controller includes a command unit for sending an operation command to the operation control unit. If the determination unit determines that the robot reaches the target position, the command unit sends a command for starting the operation of the device to the operation control unit.

An operation adjustment method according to an aspect of the present disclosure adjusts an operation of a robot apparatus based on an image captured by a high-speed camera. The robot apparatus includes a robot and a device that operates in response to an operation of the robot. The high-speed camera is formed so as to capture images at a time interval that coincides with a control cycle for sending an operation command to the robot. The operation adjustment method includes an imaging step in which the high-speed camera captures an image of at least one of the robot and the device at the time interval that coincides with the control cycle. The operation adjustment method includes an image processing step for processing images captured by the high-speed camera. The operation adjustment method includes a determination step for determining whether at least one of the operation of the robot and an operation of the device is a predetermined operation based on a result of processing of the images. The operation adjustment method includes a correction step for correcting a command statement included in an operation program. If, at the determination step, it is determined that at least one of the operation of the robot and the operation of the device is not the predetermined operation, a command statement included in the operation program is corrected at the correction step so that the operation of the robot and the operation of the device correspond to the predetermined operation.

BRIEF DESCRIPTION OF THE DRAWINGS

FIG. 7 shows an example of an operation program in the embodiment.

DETAILED DESCRIPTION

Referring to FIGS. 1 to 9, an operation adjustment apparatus for adjusting the operation of a robot apparatus and an operation adjustment method for adjusting the operation of the robot apparatus in an embodiment will be described. The robot apparatus includes a robot and an operation tool attached to the robot. The robot apparatus may include a peripheral device arranged around the robot. In the present embodiment, the robot apparatus that conveys a workpiece will be described as an example.

Figure 1:
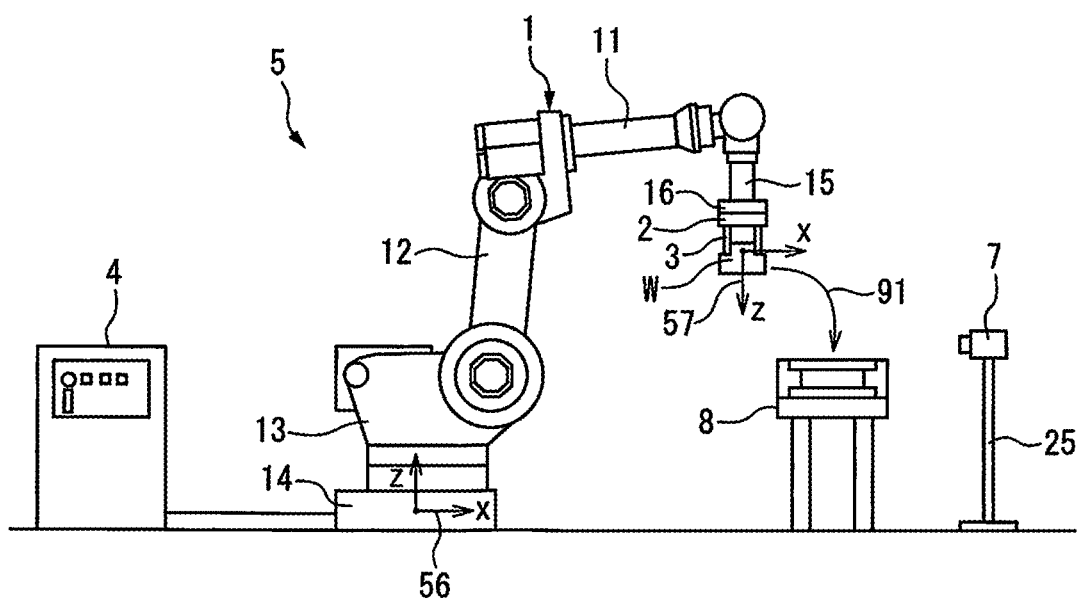
FIG. 1 is a schematic side view of a robot apparatus in an embodiment.

FIG. 1 is a schematic view of the robot apparatus in the present embodiment. The robot apparatus 5 includes a hand 2 as an operation tool (end effector) and a robot 1 that moves the hand 2. The robot 1 of the present embodiment is an articulated robot including a plurality of joints.

The robot 1 includes a base 14 and a rotation base 13 supported by the base 14. The base 14 is secured to an installation surface. The rotation base 13 is formed so as to rotate with respect to the base 14. The robot 1 includes an upper arm 11 and a lower arm 12. The lower arm 12 is rotatably supported by the rotation base 13 via a joint. The upper arm 11 is rotatably supported by the lower arm 12 via a joint. Further, the upper arm 11 rotates around its rotation axis parallel to the extending direction of the upper arm 11.

The robot 1 includes a wrist 15 coupled to an end of the upper arm 11. The wrist 15 is rotatably supported by the upper arm 11 via a joint. The wrist 15 includes a flange 16 that is formed rotatably. The hand 2 is secured to the flange 16 of the wrist 15. The robot 1 of the present embodiment has six drive axes, but the embodiment is not limited to this. Any robot that can move the operation tool can be adopted.

The hand 2 is an operation tool for grasping and releasing a workpiece W. The hand 2 has a plurality of claws 3. The claws 3 grasp the workpiece W by sandwiching the workpiece W. The hand 2 is formed so that the claws 3 open and close. The hand 2 of the present embodiment has the claws 3, but the embodiment is not limited to this. The hand can adopt any configuration formed so as to be able to grasp a workpiece. For example, a hand that grasps a workpiece by suction or magnetic force may be adopted.

The robot apparatus 5 in the present embodiment includes a conveyor 8 as a peripheral device disposed around the robot 1. The conveyor 8 is formed so as to convey the workpiece W to another position.

The robot apparatus 5 of the present embodiment grasps the workpiece W disposed on a working table (not shown). The robot 1 changes its position and orientation so that the hand 2 can grasp the workpiece W placed on the working table. The claws 3 of the hand 2 are closed and thereby grasp the workpiece W. Subsequently, the robot 1 changes its position and orientation and thereby convey the workpiece W to a placement surface of the conveyor 8. Subsequently, the hand 2 opens the claws 3 and thereby releases the workpiece W. The conveyor 8 starts an operation after the workpiece W is placed, and conveys the workpiece W to a predetermined position. In this way, the operation of the robot 1 and the operation of the hand 2 are linked. The hand 2 corresponds to a device that operates corresponding to the operation of the robot 1.

The robot 1 of the present embodiment is driven at high speed. As a robot driven at high speed, for example, a robot in which a tool center point can move at a speed of 2000 mm/sec or more can be shown. It is difficult to visually observe the state of such a robot driven at high speed.

The robot apparatus 5 in the present embodiment includes a camera 7 disposed so as to capture an image of at least one of the robot 1 and the hand 2. The camera 7 is supported by a pedestal 25. The camera 7 of the present embodiment is a high-speed camera that can capture many images per second. As a high-speed camera, a camera that can capture images of 30 frames per second (30 fps) or more is shown as an example. As the camera 7, a camera that captures a motion image can be adopted. Alternatively, a camera that captures a plurality of still images may be adopted as the camera 7.

A reference coordinate system 56 is set in the robot apparatus 5 of the present embodiment. In the example shown in FIG. 1, the origin of the reference coordinate system 56 is arranged on the base 14 of the robot 1. The reference coordinate system 56 is also referred to as a world coordinate system. The reference coordinate system 56 is a coordinate system in which the position of the origin is fixed and the direction of the coordinate axes is fixed. Even if the position and orientation of the robot 1 change, the position and direction of the reference coordinate system 56 do not change. The reference coordinate system 56 has an X-axis, a Y-axis, and a Z-axis, which are orthogonal to one another as coordinate axes. Further, a W-axis is set as a coordinate axis around the X-axis. A P-axis is set as a coordinate axis around the Y-axis. A R-axis is set as a coordinate axis around the Z-axis.

In the present embodiment, a tool coordinate system 57, which has an origin set at any position of the operation tool, is set. When the robot 1 changes its position and orientation, the position and direction of the tool coordinate system 57 change. The tool coordinate system 57 has an X-axis, a Y-axis, and a Z-axis, which are orthogonal to one another as coordinate axes. In the example shown in FIG. 1, the origin of the tool coordinate system 57 is set at the tool center point. Further, the tool coordinate system 57 is set so that the extending direction of the Z-axis is parallel to the extending direction of the claws 3 of the hand 2. Further, the tool coordinate system 57 has a W-axis around the X-axis, a P-axis around the Y-axis, and an R-axis around the Z-axis. For example, the position of the robot 1 corresponds to the position of the tool center point. Further, the orientation of the robot 1 corresponds to the direction of the tool coordinate system 57 with respect to the reference coordinate system 56.

Figure 2:
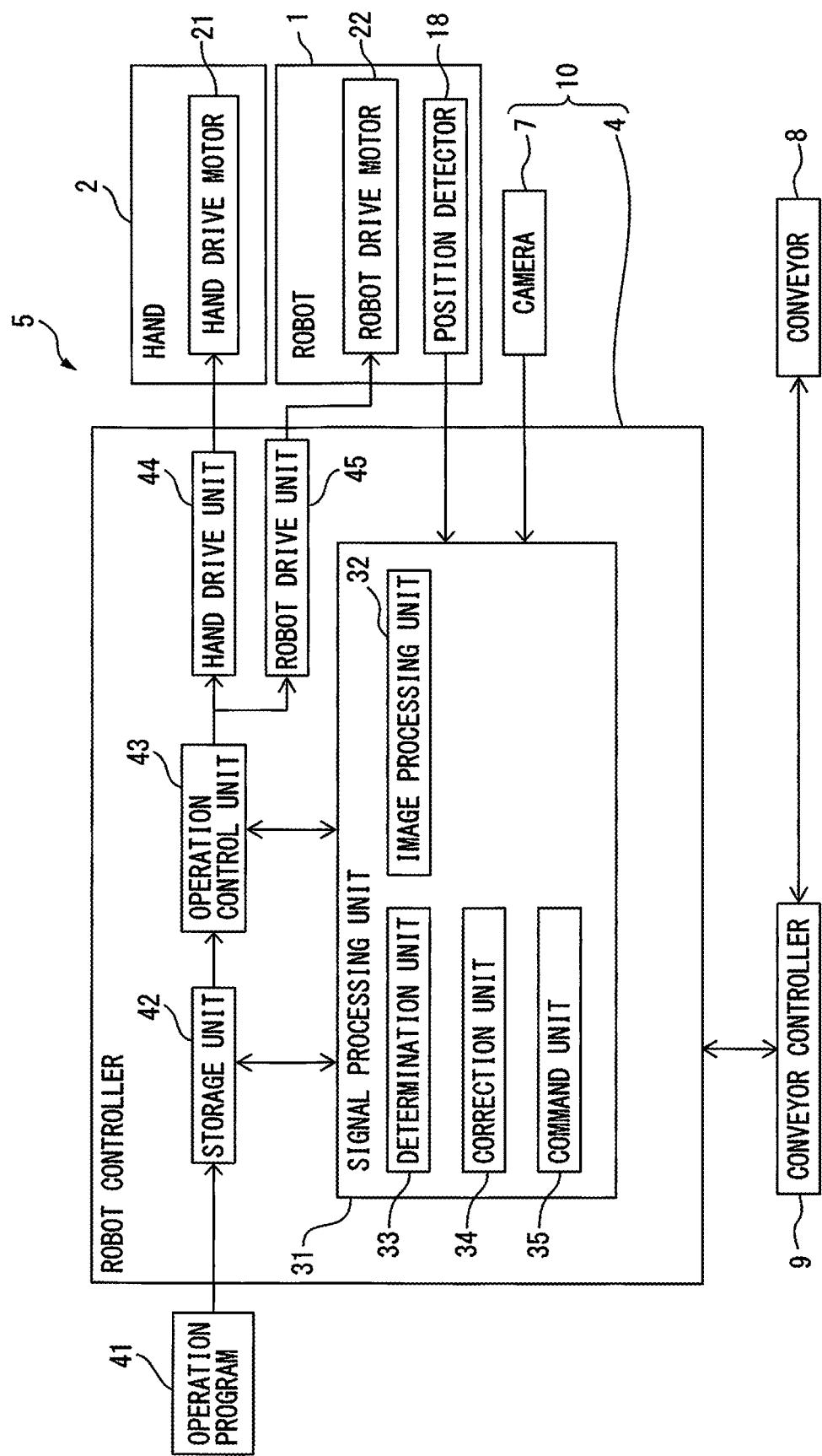
FIG. 2 is a block diagram of the robot apparatus in the embodiment.

FIG. 2 is a block diagram of the robot apparatus in the present embodiment. Referring to FIGS. 1 and 2, the robot 1 includes a robot drive device that changes the position and orientation of the robot 1. The robot drive device includes robot drive motors 22 that drive components such as an arm and a wrist. The robot drive motors 22 are driven and thereby change the direction of each component.

The hand 2 includes a hand drive device that drives the hand 2. The hand drive device includes a hand drive motor 21 that drives the claws 3 of the hand 2. The hand drive motor 21 is driven and thereby opens or closes the claws 3 of the hand 2. It should be noted that the claws may be formed so as to be operated by air pressure. In this respect, the hand drive device can include a device for driving the claws, such as an air pump and an air cylinder.

The controller for the robot apparatus 5 includes a robot controller 4. The robot controller 4 includes an arithmetic processing device (computer) having a CPU (Central Processing Unit) as a processor. The arithmetic processing device includes a RAM (Random Access Memory) and a ROM (Read Only Memory), which are connected to the CPU via a bus. An operation program 41, which has previously been created in order to control the robot 1, the hand 2, and the conveyor 8, is input to the robot controller 4. The robot controller 4 includes a storage unit 42 that stores information related to control of the robot 1, the hand 2, and the conveyor 8. The storage unit 42 can be configured by a storage medium capable of storing information, such as a volatile memory, a nonvolatile memory, or a hard disk. The operation program 41 is stored in the storage unit 42. The robot apparatus 5 of the present embodiment conveys the workpiece W based on the operation program 41. The robot apparatus 5 can automatically convey the workpiece W to a predetermined position.

The robot controller 4 includes an operation control unit 43 that sends an operation command. The operation control unit 43 corresponds to the processor that is driven according to the operation program 41. The processor functions as the operation control unit 43 by reading the operation program 41 and performing a control operation defined in the operation program 41.

The operation control unit 43 sends an operation command for driving the robot 1 to the robot drive unit 45 based on the operation program 41. The robot drive unit 45 includes an electric circuit that drives the robot drive motors 22. The robot drive unit 45 supplies electricity to the robot drive motors 22 based on the operation command. Further, the operation control unit 43 sends an operation command for driving the hand 2 to a hand drive unit 44 based on the operation program 41. The hand drive unit 44 includes an electric circuit that drives the hand drive motor 21. The hand drive unit 44 supplies electricity to the hand drive motor 21 based on the operation command. Further, the operation control unit 43 sends a command for capturing an image to the camera 7 based on the operation program 41.

The robot 1 includes a state detector for detecting the position and orientation of the robot 1. The state detector in the present embodiment includes position detectors 18 attached to the robot drive motors 22 corresponding to drive axes of components including an arm. With the output of the state detector, it is possible to acquire the directions of the components on the respective drive axes. For example, the position detectors 18 detect the rotation angles of the robot drive motors 22 being driven. Based on the outputs of the position detectors 18, the position and orientation of the robot 1 are detected.

The controller for the robot apparatus 5 includes a conveyor controller 9 that controls the operation of the conveyor 8. The conveyor controller 9 includes an arithmetic processing device (computer) including, for example, a CPU and a RAM. The conveyor controller 9 is formed so as to be able to mutually communicate with the robot controller 4. The conveyor controller 9 receives a command from the robot controller 4 and causes the conveyor 8 to be driven. Further, the conveyor controller 9 causes the conveyor 8 to stop when the conveyor 8 completes the transportation of the workpiece W to a predetermined position. The conveyor controller 9 transmits a signal indicating that the conveyor 8 stops to the robot controller 4.

The controller for the robot apparatus 5 of the present embodiment includes the robot controller 4 which controls the robot 1 and the hand 2, and the conveyor controller 9 which controls the conveyor 8, but the embodiment is not limited to this. The robot apparatus 5 may be formed so as to control the robot 1, the hand 2, and the conveyor 8 with one controller.

Figure 3:
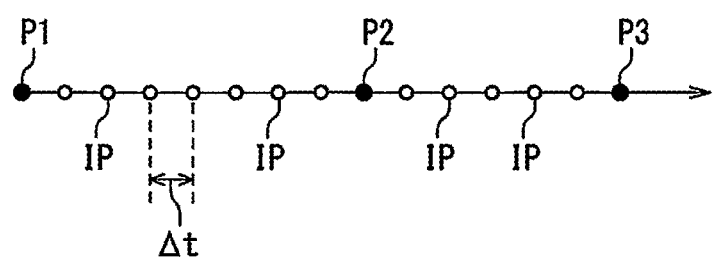
FIG. 3 is a diagram illustrating a control cycle in which an operation control unit of a controller transmits a robot operation command.

FIG. 3 is a diagram illustrating a control cycle transmitted by the operation control unit of the controller. FIG. 3 shows movement points P1, P2 and P3 described in the operation program. For example, the robot 1 is controlled so that the tool center point moves from the movement point P1 to the movement point P2. Further, the robot 1 is controlled so that the tool center point moves from the movement point P2 to the movement point P3. In the operation program 41, the positions of the movement points P1, P2 and P3 and the orientations of the robot 1 at each position are defined.

The operation control unit 43 sends an operation command to the robot 1 at a predetermined control cycle Δt. The control cycle Δt is previously determined according to the performance of the robot 1. Alternatively, an operator may input the control cycle Δt to the robot controller. The control cycle Δt of the robot 1 is, for example, a time in a range of 1 msec. or more and 8 msec. or less.

The operation control unit 43 acquires the position and orientation of the robot 1 at the movement points P1, P2 and P3 from the operation program 41. Subsequently, the operation control unit 43 adds interpolation points IP between the respective movement points P1, P2 and P3. The interpolation points IP are set between the movement points adjacent to each other. The interpolation points IP are generated based on the time interval of the control cycle Δt of the robot 1. Further, the interpolation points IP are created based on the driving method of the robot 1, such as the driving speed and linear movement of the robot 1.

The operation control unit 43 calculates the position and orientation of the robot 1 at each interpolation point IP. The operation control unit 43 sends an operation command for each interpolation point IP. The position and orientation of the robot 1 are controlled so that the tool center point passes through the movement points P1, P2 and P3 and the interpolation points IP set between the movement points P1, P2 and P3. Alternatively, the robot 1 is controlled so that the tool center point passes through the vicinity of the movement points P1, P2 and P3 and the vicinity of the interpolation points IP.

Referring to FIG. 1, the robot apparatus 5 of the present embodiment conveys the workpiece W as indicated by arrow 91. The operation of the robot 1 and the hand 2 causes the workpiece W to be arranged on the placement surface of a belt of the conveyor 8. The robot 1 changes its position and orientation and thereby changes the position and direction of the workpiece W. In the present embodiment, the workpiece W, which is rotated by 90° around the Z-axis of the tool coordinate system 57 from the state shown in FIG. 1, is placed on the conveyor 8.

Referring to FIGS. 1 and 2, the camera 7 in the present embodiment is formed so as to capture images at a time interval that coincides with the control cycle Δt of the robot 1. For example, the camera is formed so as to capture images at a time interval identical to the control cycle Δt. In other words, the camera is formed so as to capture an image at every 5 msec. (200 fps) if the control cycle is 5 msec. Alternatively, the camera may be formed so as to capture images at a time interval that is a divisor of the control cycle. For example, if the control cycle is 4 msec., the camera may be formed so as to capture images at a time interval of 1 msec. or 2 msec. Even in this case, the camera can capture images at a time interval identical to the control cycle.

Figure 4:
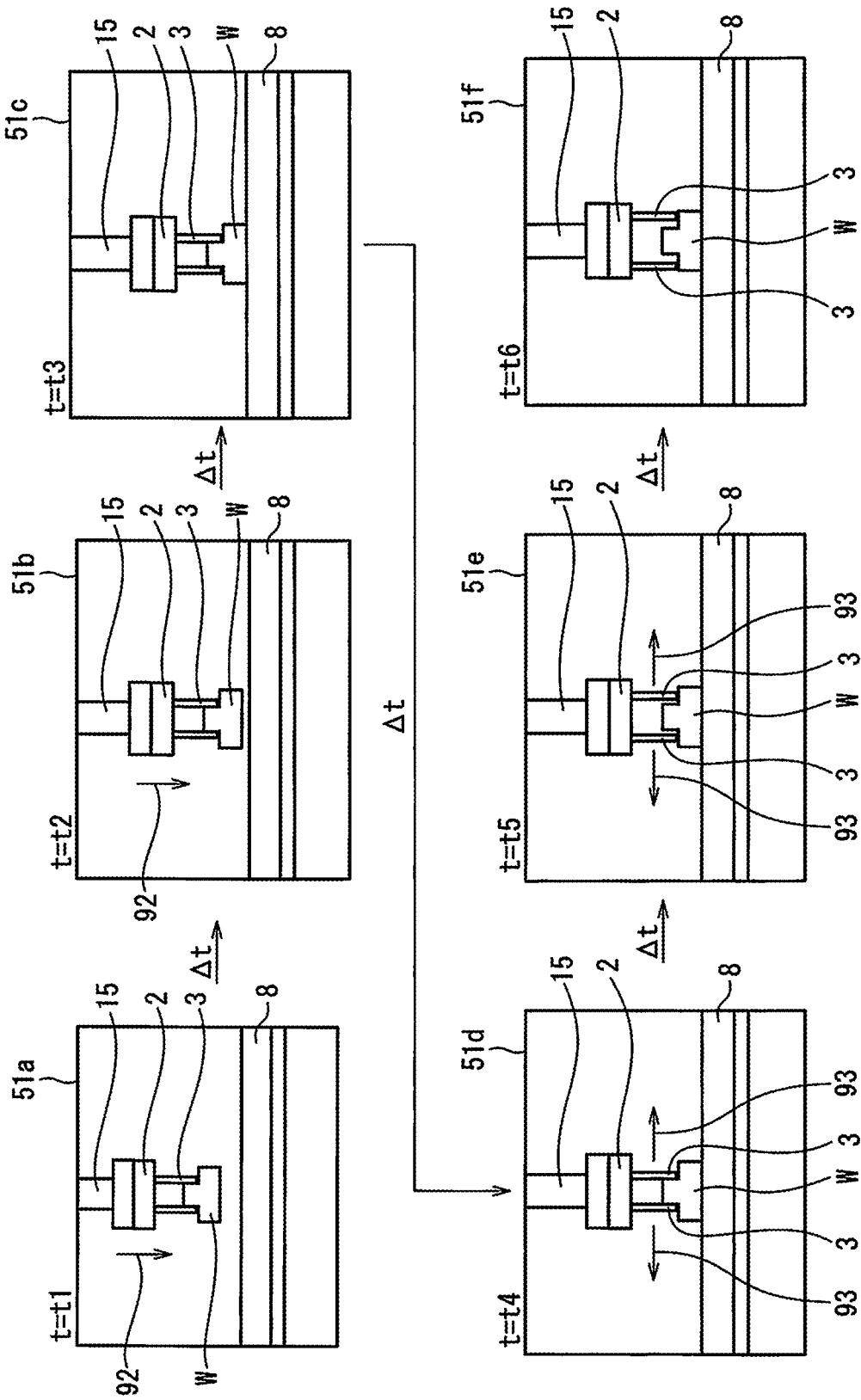
FIG. 4 shows images obtained by capturing images of a hand which starts being driven at a desired time and places a workpiece on a conveyor.

FIG. 4 shows images captured by the camera when the workpiece is conveyed to the conveyor. FIG. 4 shows images 51a to 51f captured at time t1 to time t6. The images 51a to 51f are images captured at a time interval Δt that coincides with the control cycle Δt. In other words, FIG. 4 shows images captured every time the operation control unit 43 sends an operation command to the robot 1 so as to cause the position and orientation of the robot 1 to change. The operation control unit 43 can send an imaging command to the camera 7 at the same time as the issuance of an operation command for the robot 1. In other words, the issuance of the operation command for the robot 1 and the issuance of the imaging command to the camera 7 can be synchronized. Alternatively, the operation control unit 43 can send a command for capturing images at a time interval identical to the control cycle Δt to the camera 7, at a time different from the time at which the operation command for the robot 1 is issued. In each of the images 51a to 51f, an image of the operation state of the robot 1 and the hand 2 is captured.

In the images 51a to 51f shown in FIG. 4, the robot 1 and the hand 2 operate as desired by the operator, so that the workpiece W is placed on the conveyor 8. In the image 51a, the workpiece W is being conveyed toward the conveyor 8 at time t1. The robot 1 changes its position and orientation toward a predetermined target position and a predetermined target orientation. The workpiece W is grasped by the claws 3 of the hand 2. The wrist 15 and the hand 2 are moving toward the placement surface of the conveyor 8 as indicated by arrow 92. In the image 51b, the workpiece W is being conveyed toward the conveyor 8 at time t2. The workpiece W moves closer to the conveyor 8 and the speed of the robot 1 is reduced.

The image 51c is an image captured at time t3. The robot 1 has reached a predetermined target position and a predetermined target orientation. The workpiece W is in contact with the placement surface of the conveyor 8 and the operation of the robot 1 is terminated. The claws 3 of the hand 2 grasp the workpiece W.

The image 51d is an image captured at time t4. In response to a command from the operation control unit 43, the claws 3 of the hand 2 start moving away from each other as indicated by arrow 93. The image 51e is an image captured at time t5. The claws 3 move away from each other as indicated by arrow 93 and thereby release the workpiece W. The image 51f is an image captured at time t6. The claws 3 of the hand 2 are completely open. When the claws 3 reaches a predetermined position, the movement of the claws 3 is terminated. The workpiece W is disposed on the placement surface of the conveyor 8. After that, the robot 1 is driven and thereby moves the hand 2 away from the workpiece W. The robot 1 changes its position and orientation in order to grasp a next workpiece W. After that, the conveyor 8 starts being driven in order to convey the workpiece W.

In the operation of the robot apparatus 5 shown in FIG. 4, the hand 2 releases the workpiece W after the robot 1 places the workpiece W at a desired position. Further, the robot 1 does not vibrate when stopping. For this reason, the robot apparatus 5 can arrange the workpiece W at a desired position on the conveyor 8. In the meantime, a device such as the hand 2 that operates corresponding to the operation of the robot 1 may deviate from the desired operation of the device with respect to the robot 1. First, first control performed by the controller will be described as an operation adjustment method for adjusting the operation of the robot apparatus. In the first control, the time for starting the operation of the hand 2 with respect to the operation of the robot 1 is adjusted.

Referring to FIG. 2, the robot apparatus 5 of the present embodiment includes an operation adjustment apparatus 10 that adjusts the operation of the robot apparatus. The operation adjustment apparatus 10 includes a robot controller 4 and a camera 7. The robot controller 4 includes a signal processing unit 31 that receives signals from the position detectors 18 and a signal from the camera 7 and processes the signals. The signal processing unit 31 includes an image processing unit 32 that processes images captured by the camera 7. The image processing unit 32 receives images captured by the camera 7. The image processing unit 32 processes images captured at a time interval that coincides with the control cycle.

The signal processing unit 31 includes a determination unit 33 that determines whether at least one of the operation of the robot 1 and the operation of the hand 2 is a predetermined operation based on a result of processing in the image processing unit 32.

The determination unit 33 determines whether the operation of the robot apparatus 5 is appropriate. In this example, the determination unit 33 determines whether the time, at which the hand 2 attached to the robot 1 releases the workpiece W, is appropriate.

The signal processing unit 31 includes a correction unit 34 that corrects a command statement included in the operation program. The determination unit 33 may determine that at least one of the operation of the robot 1 and the operation of the hand 2 is not a predetermined operation. In this respect, the correction unit 34 corrects the command statement included in the operation program 41 so that the operation of the robot 1 and the operation of the hand 2 correspond to predetermined operations.

Each of the units, i.e., the signal processing unit 31, the image processing unit 32, the determination unit 33, the correction unit 34, and the command unit 35 corresponds to a processor that is driven according to the operation program 41. The processor reads the operation program 41 and performs a control operation defined in the operation program 41 so as to function as each unit.

In the first control, an example, in which the claws 3 of the hand 2 open at early time when the workpiece W is placed on the placement surface of the conveyor 8, will be described. The correction unit 34 corrects the command statement included in the operation program 41 so that the claws 3 open at late time when the robot 1 reaches a target position.

Figure 5:
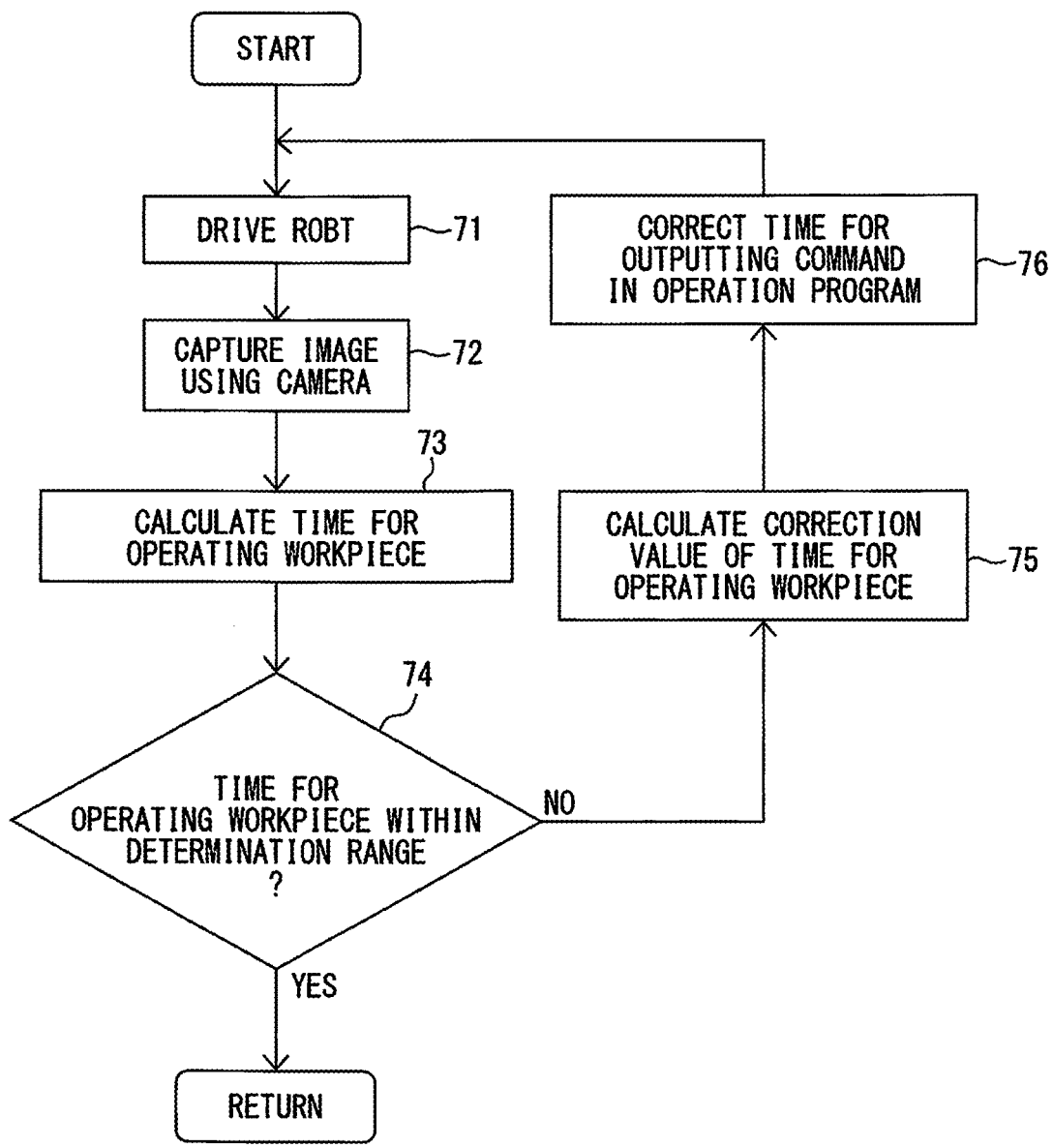
FIG. 5 is a flowchart of first control in the embodiment.
Figure 6:
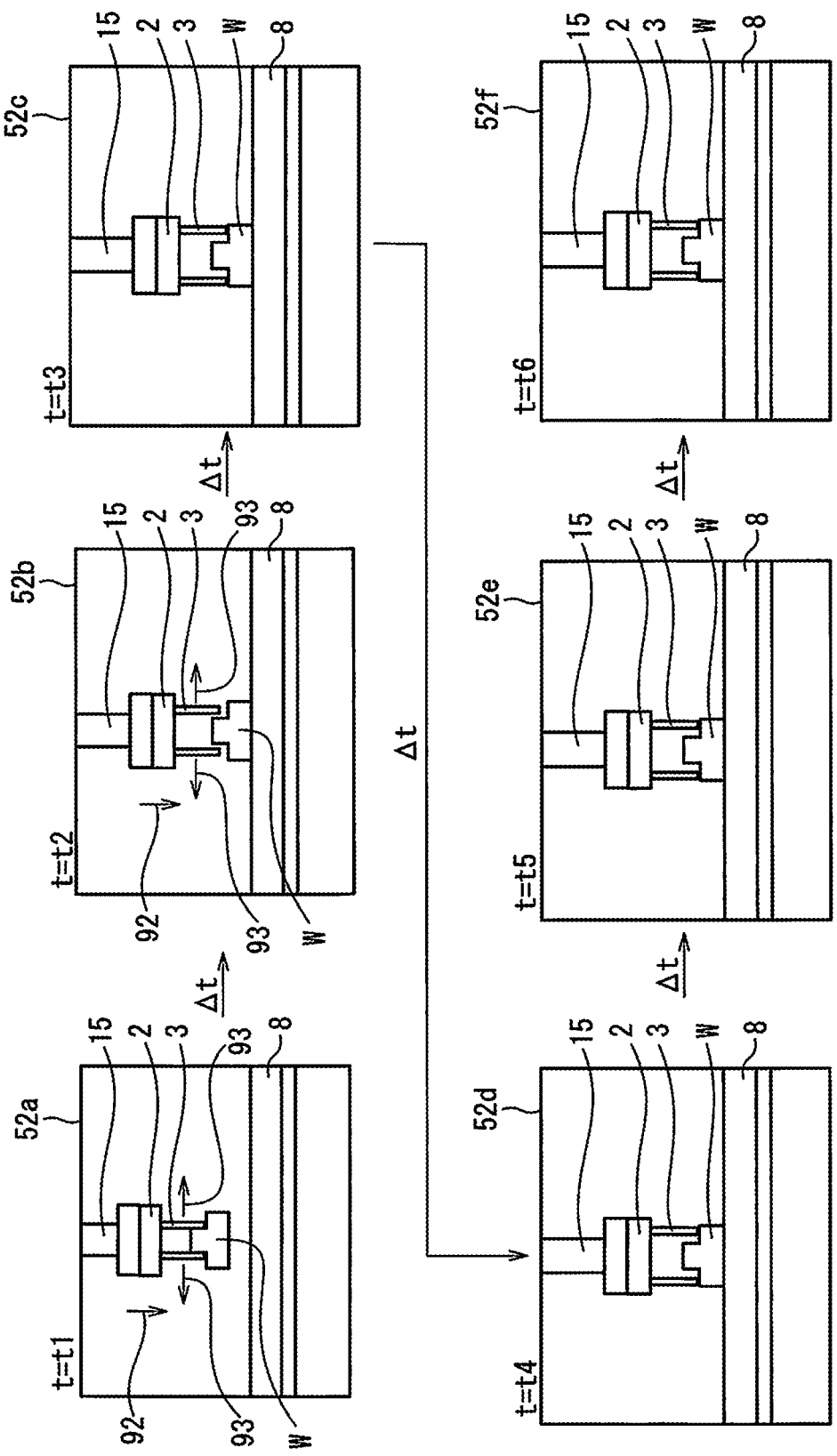
FIG. 6 shows images obtained by capturing images of the hand which starts being driven at a time earlier than a desired time and places a workpiece on the conveyor.

FIG. 5 is a flowchart of the first control in the present embodiment. FIG. 6 shows images obtained by capturing images of the claws which open at a time earlier than a desired time. Referring to FIGS. 5 and 6, at step 71, the operation control unit 43 performs a driving step for driving the robot 1 so that the workpiece W is conveyed toward the conveyor 8 based on the operation program 41. The operation control unit 43 controls the robot 1 and the hand 2 so that the workpiece W placed on the working table is grasped. The operation control unit 43 controls the position and orientation of the robot 1 so that the workpiece W is placed on the placement surface of the conveyor 8.

At step 72, the operation control unit 43 performs an imaging step for capturing an image of an area where the workpiece W is placed on the conveyor 8 by using the camera 7. The camera 7 captures images of the robot 1 and the hand 2 at a time interval that coincides with the control cycle.

FIG. 6 shows images 52a to 52f captured in the imaging step. FIG. 6 shows images captured at times t1 to t6 identical to those in FIG. 4. The image 52a is an image captured at time t1. The wrist 15 and the hand 2 have moved to the vicinity of the surface of the conveyor 8. The robot 1 changes its position and orientation toward the target position and target orientation.

As shown in the images 51c to 51f in FIG. 4, in the hand 2, it is necessary to open the claws 3 after the workpiece W is placed on the placement surface of the conveyor 8. However, in the image 52a in FIG. 6, the claws 3 start opening as indicated by arrow 93 at time t1. In other words, the claws 3 open at a time earlier than the desired time, and the hand 2 performs an operation different from the predetermined operation. The workpiece W is released from the claws 3 and then falls onto the placement surface of the conveyor 8. The workpiece W may be arranged at a position deviated from a desired position. Alternatively, the workpiece W may be thrown up in the air by the operation of the robot 1.

The image 52b is an image captured at time t2. In the image 52b, the claws 3 continues to open as indicated by arrow 93. Further, the robot 1 changes its position and orientation toward the target position and target orientation as indicated by arrow 92. The workpiece W falls from the hand 2 and is disposed on the surface of the conveyor 8.

The image 52c is an image captured at time t3. The hand 2 has reached a desired position with respect to the conveyor 8. In other words, the robot 1 has reached the target position and target orientation. The hand 2 is fully open.

The image 52d is an image captured at time t4. The image 52e is an image captured at time t5. The image 52f is an image captured at time t6. As shown in the images 52d to 52f, the robot 1 stops and the hand 2 is still open. Referring to FIG. 4, in a normal operation, the period from time t4 to time t6 is a period during which the claws 3 are open, but in the example shown in FIG. 6, the opening operation of the claws 3 is terminated at time t3.

Referring to FIG. 5, at step 73, the image processing unit 32 performs an image processing step for processing images captured by the camera 7. The image processing unit 32 receives images captured by the camera 7. The image processing unit 32 calculates the time for operating the workpiece W. In this example, the image processing unit 32 detects the time, at which the hand 2 starts to open, based on the images 52a to 52f.

In the present embodiment, a plurality of reference images of the hand 2, in which the positions of the claws 3 are different from one another, are stored in the storage unit 42. Referring to FIG. 4, for example, a reference image of the hand 2, in which the claws 3 are closed as shown in the image 51a (a reference image of the hand 2, in which the workpiece W is grasped by the claws 3), and a reference image of the hand 2, in which the claws 3 are slightly opened as shown in the image 51e, are stored in the storage unit 42. These reference images can be obtained by an operator previously capturing the hand 2 and can be input to the robot controller 4.

The image processing unit 32 determines which image contains the reference image of the hand 2, in which the claws 3 are closed, in the images 52a to 52f shown in FIG. 6. For example, the image processing unit 32 detects an image of the hand 2, in which the claws 3 are closed, by comparing the images of the hand 2 by a pattern matching method. Further, the image processing unit 32 detects an image containing the reference image of the hand 2, in which the claws 3 are slightly opened. As a result, the image processing unit 32 determines that the reference image of the hand 2, in which the claws 3 are closed, is included in the image 52a. Further, the image processing unit 32 determines that the reference image of the hand 2, in which the claws 3 are slightly opened, is included in the image 52b. In this way, the image processing unit 32 determines that the time at which the hand 2 starts the operation is the time t1 at which the claws 3 start to open.

In the example of normal driving shown in FIG. 4, the claws 3 are closed in the image 51d at time t4, and the claws 3 are slightly opened in the image 51e at time t5. For this reason, time t4 can be set as the time at which the claws 3 start to open. In other words, the time t4 can be set as the target time at which the hand 2 starts being driven. Further, it is possible to set a determination range of the target time at which the hand 2 starts being driven. In this example, the period after the workpiece W is placed on the conveyor 8 can be set as the determination range of the target time. In the present embodiment, the period from time t3 to time t5 is set as the determination range of the target time at which the hand 2 starts the operation.

The determination range of the target time is previously determined and stored in the storage unit 42. The determination range of the target time can be previously set by the operator. Alternatively, based on the images 51a to 51f shown in FIG. 4, the image processing unit 32 may set a determination range of the target time by, for example, a pattern matching method.

Referring to FIG. 5, at step 74, the determination unit 33 performs a determination step for determining whether the operation of the hand 2 is a predetermined operation, based on a result of the processing of images. In the determination step in the first control, whether the operation of the hand 2 is appropriate is determined. In this determination step, whether the time, at which the hand 2 operates the workpiece W, remains within the determination range is determined. The determination unit 33 determines whether the time detected by the image processing unit 32, at which the hand 2 starts the operation, deviates from the determination range of the target time. At step 74, if the time for operating the workpiece W remains within the determination range, this control is terminated.

As described above, the image processing unit 32 determines that the time at which the hand 2 starts the operation is the time t1. In contrast, the determination range of the target time is the period from time t3 to time t5. For this reason, the determination unit 33 determines that the time, at which the hand 2 starts the operation, deviates from the target determination range. At step 74, if the time for operating the workpiece W deviates from the determination range of the target time, the control shifts to step 75.

Subsequently, the correction unit 34 performs a correction step for correcting a command statement included in the operation program 41 so that the operation of the hand 2 is a predetermined operation. Based on the difference between the determination range of the target time and the time detected by the image processing unit 32, at which the hand 2 starts the operation, the correction unit 34 corrects the command statement for the time at which the hand 2 starts the operation in the operation program 41.

At step 75, the correction unit 34 calculates a correction value for the time for operating the workpiece W. In this example, time t4, i.e., the central time in the determination range from time t3 to time t5, is adopted as the most preferable target time. The correction unit 34 calculates a correction value so that the time at which the hand 2 starts the operation is time t4. The correction unit 34 can set the time length of (t4−t1) as the correction value.

At step 76, the correction unit 34 receives the operation program 41 from the storage unit 42. The correction unit 34 corrects the command statement included in the operation program so that the time at which the hand 2 starts the operation is delayed by the time length of (t4−t1). An example of the operation program will now be described.

FIG. 7 shows an example of the operation program in the present embodiment. The operation program 41 includes information regarding movement points for defining the operation of the robot 1. In the operation program 41, the movement points are designated by the symbol P. In the example shown in FIG. 7, a movement point P[1] and a movement point P[2] are set. The position and orientation of the robot 1 at each movement point are described at the end of the operation program 41. Alternatively, the position and orientation of the robot 1 at each movement point may be quoted from a setting file that sets variables of the operation program 41 in detail. In the present embodiment, the position of the robot 1 at each movement point is specified by the position of the tool center point. Further, the orientation of the robot 1 at each movement point is specified by the direction of the tool coordinate system 57. The direction of the tool coordinate system 57 can be specified by the coordinate value of the W-axis, the coordinate value of the P-axis, and the coordinate value of the R-axis in the reference coordinate system 56.

The robot controller 4 controls the robot 1 so that the robot 1 passes through each movement point or the vicinity of each movement point. For example, in the command statement on the first line of the operation program 41, a command for moving the tool center point to the movement point P[1] is described. Further, in the command statement on the second line, a command statement indicating that the tool center point moves from the movement point P[1] to the movement point P[2] is described. In the command statement on the third line, a command for moving from the movement point P[2] to the movement point P[1] is described.

In each command statement, the symbol L indicates that the tool center point moves linearly. Further, a command for moving the tool center point at a speed of 4000 mm/sec is shown. Further, the symbol CNT indicates a variable of an allowable distance from the movement point. The greater the value following the symbol CNT, the longer the allowable distance from the movement point. As the value following the symbol CNT increases, the smoothness of the operation of the robot 1 improves.

In the second command statement, the symbol P[2: Drop_Pos] indicates that the movement point P[2] is a position at which the workpiece W is placed. The symbol "TB 0.01 sec, RO[1]=OFF" indicates a control operation for turning the device RO[1] into "OFF" 0.01 seconds before the robot 1 reaches the movement point P[2]. The device RO[1] here is the hand 2. In this way, a control operation, in which a command for starting to release the workpiece W 0.01 seconds before the robot 1 reaches the movement point P[2] is sent to the hand 2, is shown. The symbol ACC100 indicates a gain obtained when the robot approaching the target position is accelerated or decelerated. The greater the value described following the symbol ACC, the greater the magnitude of acceleration.

Referring to FIGS. 2, 5 and 7, at step 76, the correction unit 34 corrects the symbol "TB 0.01 sec" so that the time, at which the hand 2 releases the workpiece W, is delayed. In this example, the correction unit 34 corrects the time so that the time is equal to a value obtained by subtracting the time length (t4−t1) from 0.01. By adopting this control, the opening time of the claws 3 can be delayed. The correction unit 34 sends the corrected operation program 41 to the storage unit 42. The operation control unit 43 controls the hand 2 based on the corrected operation program 41.

Subsequently, the control returns to step 71. In the first control of the present embodiment, after the command in the operation program 41 is corrected at step 76, the above-described program correction control at steps 71 to 76 is repeated. In other words, the robot controller 4 causes the robot 1 and the hand 2 to operate in the same manner as last time, after the command statement of the operation program 41 is corrected by the correction unit 34. Further, the camera 7 captures images. The robot controller 4 determines whether the operation of the hand 2 is a predetermined operation, based on a result of processing of the images captured at a time interval corresponding to the control cycle. By adopting this control, it is possible to determine whether the operation of the robot apparatus 5 is appropriately adjusted.

Further, when the operation of the hand 2 is not a predetermined operation, the command included in the operation program is corrected. In the meantime, at step 74, if the time for operating the workpiece W remains within the determination range, this control is terminated. In the present embodiment, the program correction control for correcting the operation program is repeated until the operation of the robot apparatus coincides with a predetermined operation. The control for correcting the operation program is performed a plurality of times, and thus the operation of the robot apparatus can more reliably be adjusted so as to be an appropriate operation. It should be noted that the control may be terminated after step 76 is first performed.

In this way, in the present embodiment, it is possible to adjust the start time of the operation of the device, at which the operation starts corresponding to the operation of the robot 1. The position at which the workpiece W is disposed can be prevented from deviating, and the workpiece can be prevented from being thrown up in the air.

In the above embodiment, the operation of the hand 2 for releasing the workpiece W is shown as an example of the operation of the hand 2, but the embodiment is not limited to this. The control of the present embodiment can also be applied to the operation of the hand 2 for grasping the workpiece W. For example, if the hand is closed early when trying to grasp a workpiece, the hand may not grasp the workpiece. Alternatively, the hand may not grasp the workpiece in a desired state. In the meantime, if the time for closing the hand is late, the robot may start being driven without the workpiece being grasped. Alternatively, the workpiece may not be grasped in a desired state. In this respect, the first control is performed and thereby adjusts the time for closing the hand and causes the workpiece to be grasped in an appropriate state.

In the above control, the time for opening and closing the hand is adjusted. However, the embodiment is not limited to this. The operation of the robot may be adjusted. The operation speed or acceleration of the robot may be adjusted so that the hand grasps or releases the workpiece at an appropriate time. For example, if the time at which the hand releases the workpiece is early, a control operation for increasing the magnitude of acceleration in deceleration phase for stopping the robot may be performed.

The second control of the controller in the present embodiment will now be described. When the operation of the robot 1 is stopped, the robot 1 may vibrate. In the second control, a control operation for correcting a command statement included in the operation program 41 is performed so as to reduce vibration generated when the robot 1 stops.

Figure 8:
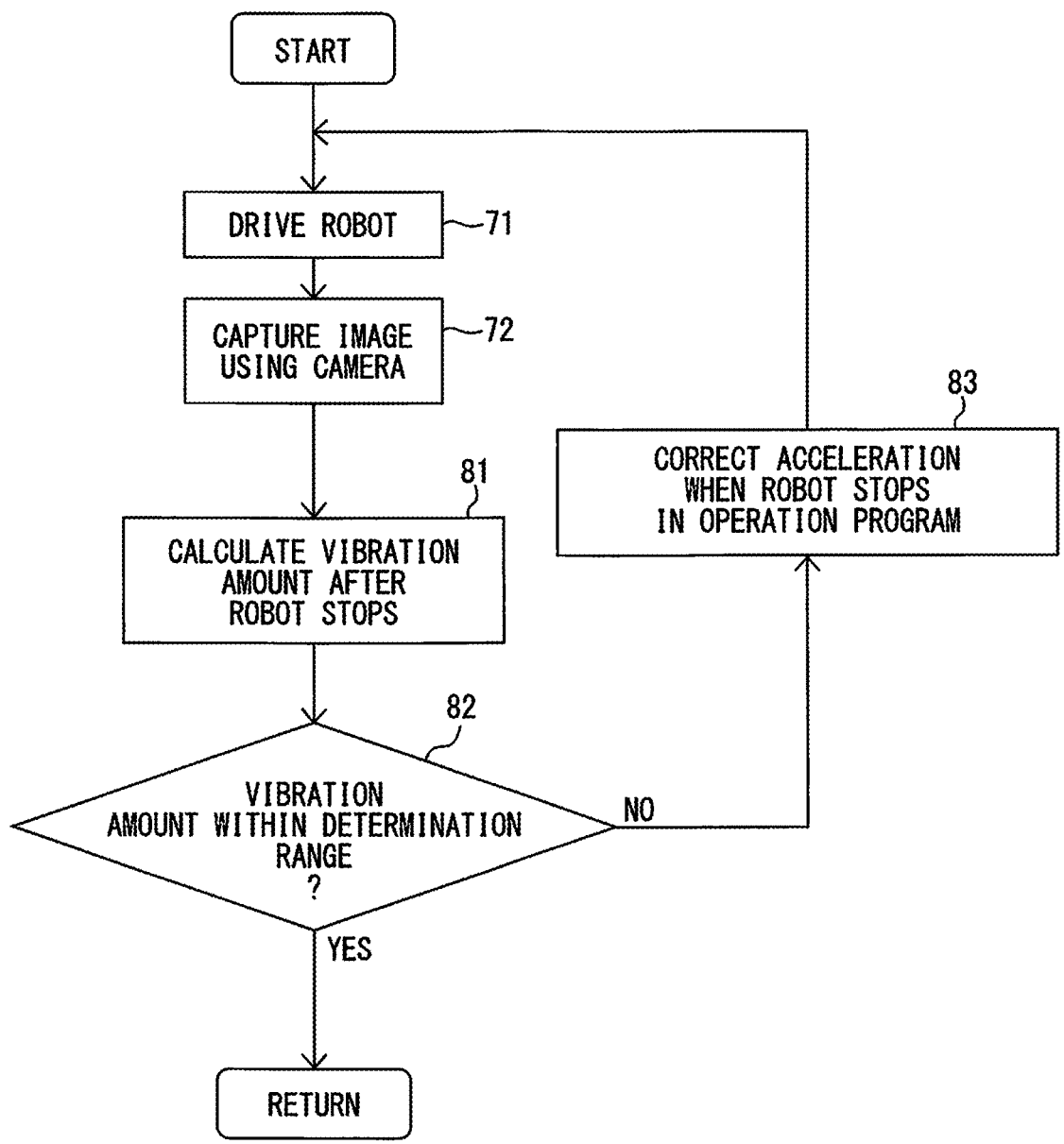
FIG. 8 is a flowchart of second control in the embodiment.

FIG. 8 is a flowchart of the second control in the present embodiment. Step 71 and step 72 are identical to those in the first control (see FIG. 5). At step 71, the robot 1 performs a driving step for driving the robot 1 so that the workpiece W is conveyed toward the placement surface of the conveyor 8. At step 72, the camera 7 performs an imaging step for capturing images at a time interval identical to the control cycle.

Figure 9:
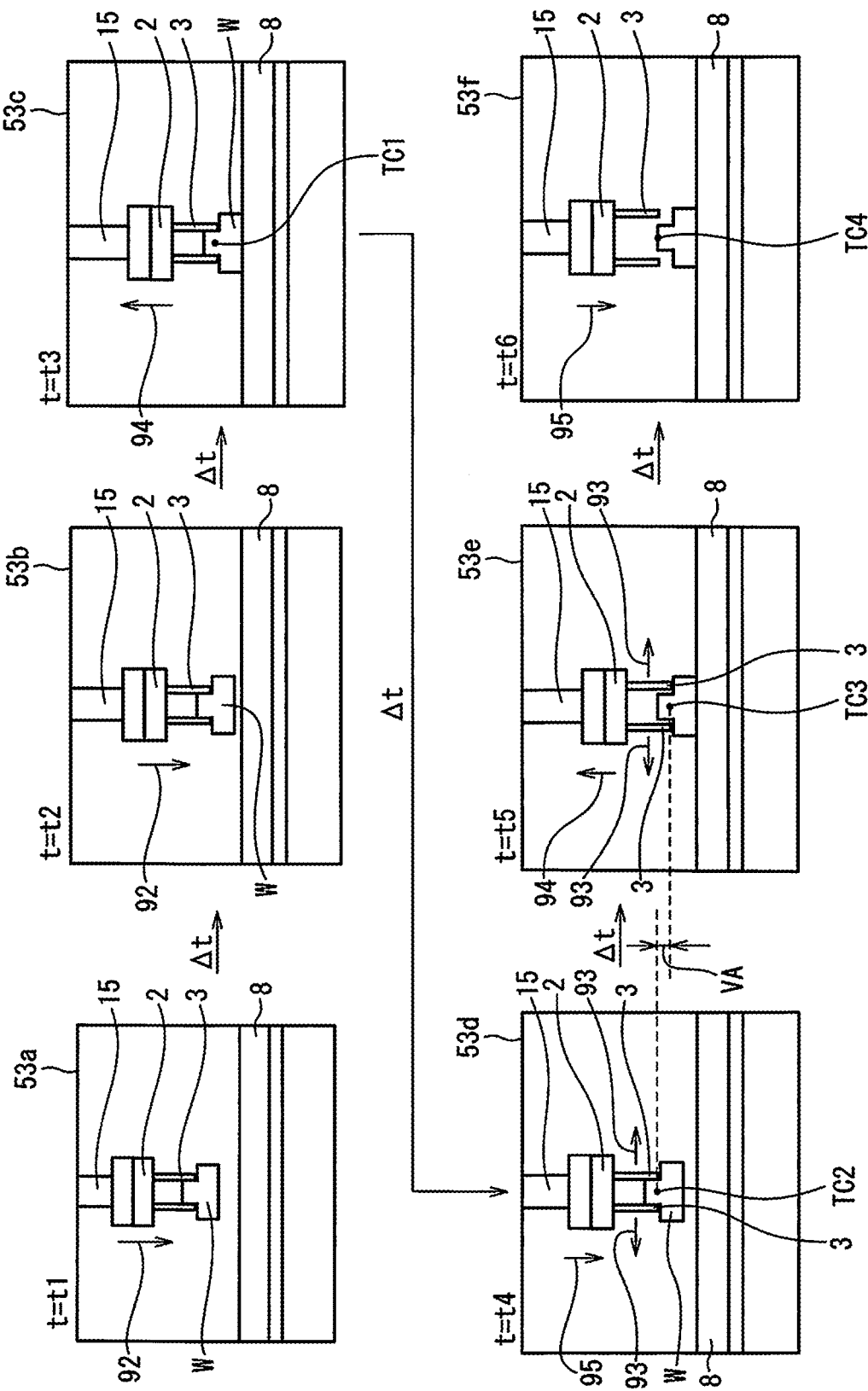
FIG. 9 shows images obtained by imaging the state in which the robot vibrates when a workpiece is placed on the conveyor.

FIG. 9 shows images of the robot which vibrates after stopping. FIG. 9 shows images 53a to 53f captured at times t1 to t6 identical to those in FIG. 4. The images 53a and 53b are the same as the images 51a and 51b in FIG. 4 in which the normal operation of the robot apparatus 5 is captured. From time t1 to time t2, the operations of the robot 1 and the hand 2 are appropriate.

The image 53c is captured at time t3. At time t3, the robot 1 reaches a target position and a target orientation and stops. A tool center point TC1 has reached a predetermined target position. At this time, the robot 1 may vibrate as the robot 1 stops. As the robot 1 vibrates, the hand 2 also vibrates. The hand 2 moves upward as indicated by arrow 94.

The image 53d is captured at time t4. The workpiece W is lifted by the vibration of the hand 2. A tool center point TC2 is higher than the position of the tool center point TC1. At time t4, as indicated by arrow 93, the claws 3 start opening. In other words, the hand 2 starts the operation. In this respect, the workpiece W is away from the conveyor 8, and thus falls toward the conveyor 8. The workpiece W may be disposed at a position deviated from a desired position. The hand 2 moves in the direction indicated by arrow 95 due to the vibration of the robot 1.

The image 53e is captured at time t5. As indicated by arrow 93, the claws 3 continues to open. Further, the hand 2 moves upward as indicated by arrow 94 due to the vibration of the robot 1.

The image 53f is captured at time t6. The robot 1 vibrates, and thus the claws 3 are arranged at positions away from the workpiece W. After that, the hand 2 moves downward as indicated by arrow 95 due to the vibration of the robot 1.

In the second control, the robot controller 4 detects a vibration amount of the operation tool when the robot 1 reaches the target position and target orientation. When the vibration amount deviates from the determination range, the robot controller 4 corrects a command statement for acceleration in deceleration phase for stopping the robot 1 in the operation program.

Referring to FIGS. 2, 8 and 9, at step 81, the image processing unit 32 performs an image processing step for processing images captured by the camera 7. The image processing unit 32 detects the vibration amount of the operation tool when the robot 1 reaches the target position based on images captured at a time interval identical to the control cycle. In the present embodiment, the image processing unit 32 detects the amplitude of vibration of the hand 2 as the vibration amount.

In the present embodiment, the position of the operation tool in the image is calibrated with respect to the actual position of the operation tool. The actual position and direction of the hand 2 can be calculated by using the reference coordinate system 56. The position of the hand 2 in the image captured by the camera 7 is calibrated with respect to the position represented in the reference coordinate system 56. In other words, if the position of the hand 2 in the image is specified, the position of the hand 2 on a plane separated from the camera 7 by a predetermined distance can be specified.

The storage unit 42 stores a reference image of the hand 2 when the claws 3 are closed (a reference image of the hand 2 when the workpiece W is grasped by the claws 3), a reference image of the hand 2 when the claws 3 are slightly opened, and a reference image of the hand 2 when the claws 3 are fully opened. The image processing unit 32 can detect the position of the hand 2 in each of the images 53a to 53f by a pattern matching method. The image processing unit 32 can calculate the actual position of the hand 2 at each time based on the position of the hand 2 in the images 53a to 53f. Further, the image processing unit 32 can calculate the actual positions of the tool center points TC1, TC2, TC3 and TC4 of the robot apparatus 5 based on the actual position of the hand 2.

The image processing unit 32 can extract an image in the term during which vibration occurs when the robot 1 stops. In the present embodiment, the storage unit 42 stores a target position at which the robot 1 stops so that the operation tool starts the operation. At time t3, the position and orientation of the robot 1 reach the target position and the target orientation. The image processing unit 32 detects time t3 at which the robot 1 reaches the target position and target orientation. The image processing unit 32 extracts a plurality of images based on the time t3 at which the robot 1 reaches the target position and target orientation. In this example, the image processing unit 32 extracts the predetermined number of images. The image processing unit 32 extracts the image 53c in which the robot 1 reaches the target position and target orientation. Further, the image processing unit 32 extracts the image 53d at time t4, the image 53e at time t5, and the image 53f at time t6, which are captured following the image 53c at time t3.

The image processing unit 32 calculates the positions of the tool center points TC1, TC2, TC3 and TC4 corresponding to the images 53c, 53d, 53e and 53f. The image processing unit 32 can calculate, as the vibration amount, the difference between the highest position and the lowest position of each tool center point. In this example, the image processing unit 32 calculates, as a vibration amount VA, the difference between the position of the tool center point TC2 and the position of the tool center point TC3. The vibration amount is not limited to this embodiment, and any value relating to the magnitude of vibration can be adopted. For example, the image processing unit 32 may extract two consecutive images and calculate, as the vibration amount, the difference between the positions of the hand 2 in the two images.

Subsequently, at step 82, the determination unit 33 performs a determination step for determining whether the operation of the robot 1 is a predetermined operation based on a result of processing of the images. In the determination step in the second control, whether the operation of the robot 1 is appropriate is determined. The determination unit 33 determines whether the vibration amount VA of the hand 2, which is detected by the image processing unit 32, deviates from the determination range of the vibration amount.

The storage unit 42 stores a determination range of the vibration amount of the operation tool when the operation of the robot 1 is stopped. The determination unit 33 determines that large vibration is generated in the robot 1 when the vibration amount VA of the hand 2 deviates from the determination range of the vibration amount. The determination unit 33 determines that the operation of the robot 1 is not a predetermined operation. In this example, the vibration amount VA of the hand 2 exceeds the upper limit value of the determination range. In this respect, the control shifts to step 83.

At step 83, the correction unit 34 performs a correction step for correcting a command statement included in the operation program 41 so that the operation of the robot 1 coincides with a predetermined operation. When the vibration amount VA of the hand 2 deviates from the determination range of the vibration amount, the correction unit 34 corrects a command statement for acceleration in deceleration phase for stopping the robot 1 in the operation program 41.

In this example, the correction unit 34 changes the magnitude of acceleration into a value obtained by subtracting a predetermined amount from the magnitude of acceleration. Referring to FIG. 7, the correction unit 34 corrects the gain value in the symbol ACC100 in the command statement on the second line. For example, the correction unit 34 changes the acceleration gain from 100 to 80. It should be noted that the correction unit 34 may calculate the magnitude of acceleration in deceleration phase based on the vibration amount. For example, the correction unit 34 may correct a command statement so that the magnitude of acceleration in deceleration phase decreases as the vibration amount increases.

After the control at step 83 ends, the control returns to step 71. Even in the second control, after the correction of the operation program 41 is completed, the program correction control from step 71 to step 83 is repeated. In this way, the control for correcting the operation program is repeated until the vibration amount falls within the determination range, and thus the vibration can be more reliably reduced. At step 82, if the vibration amount VA remains within the determination range, this control is terminated. Alternatively, as in the first control, the control may be terminated after step 83 is performed once.

In the second control, the operation program can be corrected so that the vibration amount of the hand 2 is reduced. The vibration of the hand 2 is reduced, and thus the workpiece W can be prevented from being deviated when being disposed. Alternatively, the workpiece W can be prevented from being thrown up in the air and being deviated from a predetermined position due to the vibration of the hand 2.

In the second control described above, as an example, the vibration amount is large when the robot stops, but the embodiment is not limited to this. The second control can also be applied even if the vibration amount is extremely small when the robot stops. For example, if the vibration amount is smaller than the lower limit value of the determination range, a control operation for increasing the magnitude of acceleration when the robot 1 stops may be performed. By adopting this control, the operation time of the robot apparatus 5 can be shortened.

In the first control and the second control described above, the image processing step for processing images captured by the camera may be performed by the operator. Further, the determination step for determining whether at least one of the operation of the robot and the operation of the hand is appropriate based on a result of processing of images may be performed by the operator. Furthermore, the operator may perform a correction step for correcting the command statement included in the operation program so that the operation of the robot 1 and the operation of the device are appropriate.

The third control in the present embodiment will now be described. In the third control, images are captured by the camera while the robot apparatus 5 is being driven. Based on the images captured by the camera, the operation of at least one of the robot and the device that operates corresponding to the operation of the robot is adjusted. Referring to FIG. 2, the signal processing unit 31 of the present embodiment includes a command unit 35 that sends a command for the operation of the robot 1 and the device that operates corresponding to the operation of the robot 1 to the operation control unit 43. The command unit 35 corresponds to a processor that is driven according to the operation program 41. The processor reads the operation program 41 and performs a control operation defined in the operation program 41 and thereby functions as the command unit 35. The hand 2 will now be described as an example of the device that operates corresponding to the operation of the robot 1.

Further, the determination unit 33 determines whether the position and orientation of the robot 1 have reached the target position and target orientation defined in the operation program 41.

In the third control, the camera 7 captures images of the robot 1 and the hand 2 at a time interval that coincides with the control cycle. The image processing unit 32 detects the position of the hand 2. The determination unit 33 determines whether the position of the hand 2 has reached the target position for starting the operation of the hand 2. In other words, the determination unit 33 determines whether the position and orientation of the robot 1 have reached the target position and target orientation described in the operation program 41. If the determination unit 33 determines that the hand 2 has reached the target position, the command unit 35 sends a command for starting the operation of the hand 2 to the operation control unit 43.

For example, referring to FIGS. 2 and 4, the camera 7 captures images of the robot 1 and the hand 2 when the workpiece W approaches the conveyor 8, as shown in the images 51a to 51c. The storage unit 42 stores a reference image in which the hand 2 is closed. The image processing unit 32 detects the position of the hand 2 in the image by the pattern matching method, based on the reference image of the hand 2. The image processing unit 32 detects the actual position of the hand 2 every time when one image is captured. Further, the image processing unit 32 detects the actual position and orientation of the robot 1. The determination unit 33 determines whether the robot 1 has reached the target position and target orientation described in the operation program 41. In this example, at time t3, the robot 1 has reached the target position and target orientation for starting the operation of the hand 2.

The determination unit 33 determines that, in the image 51c, the robot 1 has reached the target position described in the operation program 41. In other words, the determination unit 33 determines that the workpiece W has been placed on the upper surface of the conveyor 8 at time t3. The command unit 35 sends a command for starting to open the claws 3 of the hand 2 to the operation control unit 43. The operation control unit 43 sends a command for opening the hand 2 to the hand drive unit 44 and performs an operation for causing the hand 2 to open the claws 3.

In this way, in the third control, images of the robot 1 that is actually driven and the device that starts to operate according to the operation of the robot 1 can be captured, and the start time of the operation of the device can be controlled. In the third control, the images are captured at a time interval that coincides with the control cycle, and thus the operation of the device can be started at an appropriate time. For example, the hand 2 can be prevented from releasing the workpiece W too early or too late. Further, the operation of the device can be started immediately after the robot 1 reaches the appropriate position and orientation. For this reason, it is not necessary to set a waiting time for waiting the stop of the robot 1 or a spare time for the operation of the robot 1, and thus it is possible to reduce the operation time.

In the first control, the second control, and the third control, the images of both the robot 1 and the hand 2 are captured, but the embodiment is not limited to this. The images of at least one of the robot 1 and the hand 2 may be captured. The position and orientation of the robot 1 correspond to the position and direction of the hand 2. In this way, the image processing unit 32 acquires the images of the robot 1 or the hand 2 and thereby detects the position and orientation of the robot 1.

In the above embodiment, the hand is shown as an example of the device that operates in response to the operation of the robot 1, but the embodiment is not limited to this. As a device that operates in response to the operation of the robot 1, any operation tool can be adopted in accordance with the operation performed by the robot apparatus.

For example, in a robot apparatus that performs spot welding, a spot welding gun as an operation tool is attached to the robot. After the spot welding gun is arranged at a predetermined position, the opposite electrodes approach each other, and spot welding is performed. In this respect, if the time for starting to move the electrodes is earlier or later than the desired time, the spot welding may not be performed at an accurate position. Alternatively, if the robot vibrates when the robot stops, the spot welding may not be performed at an accurate position. It is possible to perform spot welding at an accurate position by applying the control of the present embodiment to the robot apparatus that performs spot welding.

Further, the device that operates in response to the operation of the robot is not limited to the operation tool, and any peripheral device arranged around the robot 1 can be adopted. In particular, any device that operates in cooperation with the robot can be shown as an example. As this apparatus, a conveyor arranged around the robot or a traveling cart that travels on the ground in order to convey a workpiece can be shown as an example.

For example, in FIG. 4, the robot 1 is driven so that the hand 2 moves away from the workpiece W after time t6. After the robot 1 is driven, the conveyor 8 starts an operation and moves the workpiece W. The control of the present embodiment can also be applied to the time at which the operation of such a conveyor 8 starts. In other words, the time for starting the operation of the conveyor 8 can be adjusted in accordance with the operations of the robot 1 and the hand 2.

According to aspects of the present disclosure, it is possible to provide an operation adjustment apparatus and an operation adjustment method, which are capable of adjusting the operation of a robot apparatus including a robot.

In each control operation described above, the order of the steps can be appropriately changed within a range where the function and the action are not changed.

The above embodiments can be combined as appropriate. In the respective drawings described above, the same or equivalent parts are denoted by the same reference numerals. It should be noted that the above embodiments are for purposes of illustration and not limitation. Further, in the embodiments, modifications of the embodiments shown in the claims are included.

The invention claimed is:

1. An operation adjustment apparatus for adjusting an operation of a robot apparatus including a robot, the operation adjustment apparatus comprising:
a high-speed camera configured to capture an image of at least one of the robot and an operation tool attached to the robot, wherein the operation tool is configured to operate in response to an operation of the robot; and
a controller including
a processor configured to control the operation of the robot and the operation tool, and receive images captured by the high-speed camera, and
a memory for storing an operation program for the robot and the operation tool,
wherein the controller is configured to send an operation command to the robot at a predetermined control cycle, the high-speed camera is configured to capture the images at a time interval that coincides with the predetermined control cycle, the controller is configured to process the images captured at the time interval that coincides with the predetermined control cycle, determine whether at least one of the operation of the robot and an operation of the operation tool is a predetermined operation based on a result of processing of the images, and correct a command statement included in the operation program, the controller is configured to, in response to determining that at least one of the operation of the robot and the operation of the operation tool is not the predetermined operation, correct the command statement included in the operation program to cause the operation of the robot and the operation of the operation tool to correspond to the predetermined operation, the memory stores a determination range of a target time at which the operation tool starts a further operation when the robot reaches a target position, the high-speed camera is configured to capture a further image of the operation tool when the robot reaches the target position, and the controller is configured to detect a time at which the operation tool starts the further operation based on further images captured at a further time interval identical to the predetermined control cycle, determine whether the time at which the operation tool starts the further operation deviates from the determination range of the target time, and in response to the time at which the operation tool starts the further operation deviating from the determination range of the target time, correct a further command statement for the time at which the operation tool starts the operation in the operation program, based on a difference between the determination range of the target time and the time at which the operation tool starts the further operation.

2. The operation adjustment apparatus according to claim 1, wherein the memory stores a further determination range of a vibration amount of the operation tool when the robot stops operating, the controller is configured to detect a further vibration amount of the operation tool after the robot reaches the target position based on the further images, determine whether the further vibration amount of the operation tool deviates from the further determination range of the vibration amount, and in response to the further vibration amount of the operation tool deviating from the further determination range of the vibration amount, correct another command statement for acceleration in a deceleration phase for stopping the robot in the operation program.

3. The operation adjustment apparatus according to claim 1, wherein after correcting the command statement in the operation program, the controller is configured to cause the robot and the operation tool to operate in the same manner as last time, the controller is configured to determine whether at least one of the operation of the robot and the operation of the operation tool is the predetermined operation based on a result of processing of the images.

4. An operation adjustment apparatus for adjusting an operation of a robot apparatus including a robot, the operation adjustment apparatus comprising:

a high-speed camera configured to capture an image of at least one of the robot and an operation tool attached to the robot, wherein the operation tool is configured to operate in response to an operation of the robot; and a controller including a processor configured to control the operation of the robot and the operation tool, and receive images captured by the high-speed camera, and a memory for storing an operation program for the robot and the operation tool, wherein the controller is configured to send an operation command to the robot at a predetermined control cycle, the high-speed camera is configured to capture the images at a time interval that coincides with the predetermined control cycle, the controller is configured to process the images captured at the time interval that coincides with the predetermined control cycle, determine whether the robot reaches a target position for starting an operation of the operation tool based on a result of processing of the images, and in response to determining that the robot reaches the target position, send a command for starting the operation of the operation tool, the memory stores a determination range of a target time at which the operation tool starts a further operation when the robot reaches the target position, the high-speed camera is configured to capture a further image of the operation tool when the robot reaches the target position, and the controller is configured to detect a time at which the operation tool starts the further operation based on further images captured at a further time interval identical to the predetermined control cycle, determine whether the time at which the operation tool starts the further operation deviates from the determination range of the target time, and in response to the time at which the operation tool starts the further operation deviating from the determination range of the target time, correct a command statement for the time at which the operation tool starts the operation in the operation program, based on a difference between the determination range of the target time and the time at which the operation tool starts the further operation.

5. An operation adjustment method for adjusting an operation of a robot apparatus based on an image captured by a high-speed camera, wherein the robot apparatus includes a robot and an operation tool attached to the robot, wherein the operation tool is configured to operate in response to an operation of the robot, and the operation adjustment method comprises:

capturing, by the high-speed camera, images of at least one of the robot and the operation tool at a time interval that coincides with a control cycle for sending an operation command to the robot;

processing the images captured by the high-speed camera;

determining whether at least one of the operation of the robot and an operation of the operation tool is a predetermined operation based on a result of said processing of the images; and in response to determining that at least one of the operation of the robot and the operation of the operation tool is not the predetermined operation, correcting a command statement included in an operation program to correspond the operation of the robot and the operation of the operation tool to the predetermined operation, and the operation adjustment method further comprises:

storing a determination range of a target time at which the operation tool starts a further operation when the robot reaches a target position, capturing, by the high-speed camera, a further image of the operation tool when the robot reaches the target position, detecting a time at which the operation tool starts the further operation based on further images captured at a further time interval identical to the predetermined control cycle, determining whether the time at which the operation tool starts the further operation deviates from the determination range of the target time, and in response to the time at which the operation tool starts the further operation deviating from the determination range of the target time, correcting a further command statement for the time at which the operation tool starts the operation in the operation program, based on a difference between the determination range of the target time and the time at which the operation tool starts the further operation.

* * * * *